United States Patent
Ren et al.

(10) Patent No.: US 11,720,219 B2
(45) Date of Patent: Aug. 8, 2023

(54) METHOD, APPARATUS AND DEVICE FOR DISPLAYING LYRIC, AND STORAGE MEDIUM

(71) Applicant: GUANGZHOU KUGOU COMPUTER TECHNOLOGY CO., LTD., Guangzhou (CN)

(72) Inventors: Sihao Ren, Guangzhou (CN); Yasong Xian, Guangzhou (CN); Fujuan Huang, Guangzhou (CN); Jianhao Hong, Guangzhou (CN)

(73) Assignee: GUANGZHOU KUGOU COMPUTER TECHNOLOGY CO., LTD., Guangzhou (CN)

(*) Notice: Subject to any disclaimer, the term of this patent is extended or adjusted under 35 U.S.C. 154(b) by 93 days.

(21) Appl. No.: 17/594,404

(22) PCT Filed: Nov. 20, 2019

(86) PCT No.: PCT/CN2019/119715
§ 371 (c)(1),
(2) Date: Oct. 14, 2021

(87) PCT Pub. No.: WO2020/258698
PCT Pub. Date: Dec. 30, 2020

(65) Prior Publication Data
US 2022/0236836 A1 Jul. 28, 2022

(30) Foreign Application Priority Data

Jun. 28, 2019 (CN) .......................... 201910578781.5

(51) Int. Cl.
*G06F 3/0481* (2022.01)
*G06F 3/04847* (2022.01)
(Continued)

(52) U.S. Cl.
CPC .......... *G06F 3/0481* (2013.01); *G06F 3/0486* (2013.01); *G06F 3/04847* (2013.01); *G06F 16/685* (2019.01)

(58) Field of Classification Search
CPC .. G06F 3/0481; G06F 3/04847; G06F 3/0486; G06F 3/04817; G06F 16/685
See application file for complete search history.

(56) References Cited

U.S. PATENT DOCUMENTS 9,224,385 B1* 12/2015 Sharifi .................... G10L 15/26
2010/0211693 A1* 8/2010 Master .................. G06F 16/683
381/94.1
(Continued)

FOREIGN PATENT DOCUMENTS

| CN | 102902453 A | 1/2013 |
| CN | 102970427 A | 3/2013 |

(Continued)

OTHER PUBLICATIONS

International Search Report and Written Opinion of PCT Patent Application No. PCT/CN2019/119715—19 pages (dated Mar. 26, 2020).

(Continued)

*Primary Examiner* — Ting Z Lee
(74) *Attorney, Agent, or Firm* — Knobbe, Martens, Olson & Bear, LLP

(57) ABSTRACT

A method, apparatus and device for displaying a lyric, and a storage medium. The method includes: displaying a control panel and a lyric display panel of a target player application on an interface; canceling the display of the control panel when a trigger operation on the interface satisfies a reference condition, and setting the lyric display panel to be in a non-triggerable state, such that a desktop area of the current interface covered by the control panel and the lyric display panel becomes capable of receiving a (Continued)

trigger operation; displaying an interactive control on the interface, the interactive control being used to perform a lyric display control function; and restoring the display of the control panel when a click operation on the interactive control is detected.

18 Claims, 4 Drawing Sheets

(51) Int. Cl.
    *G06F 3/0486*     (2013.01)
    *G06F 16/68*     (2019.01)
    *G06F 16/683*     (2019.01)

(56) References Cited

U.S. PATENT DOCUMENTS

2011/0137920 A1* 6/2011 Cohen ............... G06Q 30/02
    707/E17.101

2014/0172429 A1* 6/2014 Butcher ............... G10L 19/018
    704/270
2017/0075558 A1     3/2017 Shapiro et al.

FOREIGN PATENT DOCUMENTS

| | | |
|---|---|---|
| CN | 104020973 A | 9/2014 |
| CN | 104898950 A | 9/2015 |
| CN | 106095467 A | 11/2016 |
| CN | 106873869 A | 6/2017 |
| CN | 108509620 A | 9/2018 |
| CN | 110275655 A | 9/2019 |
| JP | 2016033539 A | 3/2016 |

OTHER PUBLICATIONS

First Office Action of Chinese Patent Application No. 201910578781. 5—20 pages (dated Mar. 3, 2021).

Second Office Action of Chinese Patent Application No. 201910578781. 5—15 pages (dated Sep. 10, 2021).

* cited by examiner

METHOD, APPARATUS AND DEVICE FOR DISPLAYING LYRIC, AND STORAGE MEDIUM

CROSS-REFERENCE TO RELATED APPLICATION

The present application is a 371 of PCT Patent Application Serial No. PCT/CN2019/119715, filed on Nov. 20, 2019, which claims priority to Chinese Patent Application No. 201910578781.5, filed on Jun. 28, 2019 and titled "LYRIC DISPLAY METHOD AND APPARATUS, DEVICE, AND STORAGE MEDIUM", the entire contents of both of which are incorporated herein by reference.

TECHNICAL FIELD

The present application relates to the field of audio control technologies, in particular to a method, apparatus and device for displaying a lyric, and a storage medium.

BACKGROUND

With the development of Internet technologies, various music players have emerged. The music player may start a function of displaying a lyric on a desktop In this function mode, a lyric display panel and a control panel are displayed on a desktop of an operating system in the form of a floating window. The lyric display panel is used to display a lyric of a song; and the control panel contains interactive controls used to control the lyric display panel.

SUMMARY

The present application provides a method, apparatus and device for displaying a lyric, and a memory medium.

According to an aspect, an embodiment of the present application provides a method for displaying a lyric. The method includes: displaying a control panel and a lyric display panel of a target player application on a current interface; canceling the display of the control panel when a trigger operation on the current interface satisfies a reference condition, and setting the lyric display panel to be in a non-triggerable state, such that a desktop area of the current interface covered by the control panel and the lyric display panel becomes capable of receiving a trigger operation, displaying an interactive control on the current interface, wherein the interactive control is used to perform a lyric display control function; and restoring the display of the control panel when a click operation on the interactive control is detected, such that the control panel controls the lyric display panel to display the lyric.

Optionally, the reference condition that is satisfied by the trigger operation on the current interface includes: detecting no trigger operation on any one of the control panel and the lyric display panel within a reference duration; or detecting a trigger operation in a desktop area outside the control panel and the lyric display panel.

Optionally, displaying the interactive control on the current interface includes: displaying the interactive control in a target display area of the lyric display panel.

Optionally, after displaying the interactive control on the current interface, the interactive control being used to perform the lyric display control function, and restoring the display of the control panel when the click operation on the interactive control is detected, such that the control panel controls the lyric display panel to display the lyric, the method further includes: in the case that a dragging operation on the interactive control is detected, changing a display position of the lyric display panel based on an operation trajectory of the dragging operation.

Optionally, when the dragging operation on the interactive control is detected, changing the display position of the lyric display panel based on the operation trajectory of the dragging operation includes: setting a background color of the lyric display panel as a first background color when the dragging operation on the interactive control is detected; during the execution of the dragging operation, moving the lyric display panel of the first background color based on the operation trajectory of the dragging operation; and setting the background color of the lyric display panel as a second background color when it is detected that the dragging operation ends, and displaying the lyric display panel of the second background color at a released position of the interactive control.

Optionally, canceling the display of the control panel when the trigger operation on the current interface satisfies the reference condition and setting the lyric display panel to be in the non-triggerable state includes: setting the background color of the lyric display panel as a target color when the lyric display panel is in the non-triggerable state.

Optionally, a song recognition function interactive control is displayed in the control panel, the song recognition function interactive control being used to trigger an audio signal collection and recognition process.

Optionally, the method further includes: canceling the display of the control panel and the lyric display panel when a trigger operation on the song recognition function interactive control is detected; and displaying a recognition interactive control on the current interface, the recognition interactive control being used to control a song recognition process.

Optionally, after displaying the recognition interactive control on the current interface, the method further includes: displaying recognized song information on the current interface when the recognition is successful.

Optionally, after displaying the recognition interactive control on the current interface, the method further includes: displaying recognition failure information when the recognition fails, and restoring the display of the control panel and the lyric display panel.

According to an aspect, an embodiment of the present application provides an apparatus for displaying a lyric. The apparatus includes: a displaying module used to display a control panel and a lyric display panel of a target player application on a current interface; a first processing module used to cancel the display of the control panel when a trigger operation on the current interface satisfies a reference condition, and set the lyric display panel to be in a non-triggerable state, such that a desktop area of the current interface covered by the control panel and the lyric display panel becomes capable of receiving a trigger operation; a second processing module used to display an interactive control on the current interface, wherein the interactive control is used to perform a lyric display control function; and a third processing module used to restore the display of the control panel when a click operation on the interactive control is detected, such that the control panel controls the lyric display panel to display the lyric.

Optionally, the reference condition that is satisfied by the trigger operation on the current interface includes: detecting no trigger operation on any one of the control panel and the lyric display panel within a reference duration; or detecting a trigger operation in a desktop area outside the control panel and the lyric display panel.

Optionally, the second processing module is used to display the interactive control in a target display area of the lyric display panel.

Optionally, the second processing module or the third processing module is further configured to, when a dragging operation on the interactive control is detected, change a display position of the lyric display panel based on an operation trajectory of the dragging operation.

Optionally, the third processing module is further configured to, when the dragging operation on the interactive control is detected, set a background color of the lyric display panel as a first background color; during the execution of the dragging operation, move the lyric display panel of the first background color based on the operation trajectory of the dragging operation; and set the background color of the lyric display panel as a second background color when it is detected that the dragging operation ends, and display the lyric display panel of the second background color at a released position of the interactive control.

Optionally, the first processing module is used to set the background color of the lyric display panel as a target color when the lyric display panel is in the non-triggerable state.

Optionally, a song recognition function interactive control is displayed in the control panel, the song recognition function interactive control being used to trigger an audio signal collection and recognition process.

Optionally, the apparatus further includes: a fourth processing module used to cancel the display of the control panel and the lyric display panel when a trigger operation on the song recognition function interactive control is detected; and display a recognition interactive control on the current interface, the recognition interactive control being used to control a song recognition process.

Optionally, the fourth processing module is further used to display recognized song information on the current interface when the recognition is successful.

Optionally, the fourth processing module is further used to display recognition failure information when the recognition fails, and restore the display of the control panel and the lyric display panel.

According to an aspect, an embodiment of the present application provides an electronic device. The electronic device includes a processor; and a memory used to store instructions executable by the processor, wherein the processor is used to execute the instructions to implement the method in any of the above possible embodiments.

According to an aspect, an embodiment of the present application provides a computer-readable storage medium. the computer-readable storage medium stores instructions therein, wherein the instructions, when being executed by a processor of a terminal, causes the terminal to perform the method according to any one of the above optional embodiments.

According to an aspect, an embodiment of the present application provides a computer program (product). The computer program (product) includes computer program codes, which, when being operated by a computer, causes the computer to perform the respective method according to the above aspect.

The technical solutions provided by the embodiments of the present application at least have the following beneficial effects.

The control panel and the lyric display panel of the target player application are displayed on the current interface. The display of the control panel is canceled when the trigger operation on the current interface satisfies the reference condition, and the lyric display panel is set to be in the non-triggerable state, such that the application icon of the current interface covered by the control panel and the lyric display panel is capable of receiving the trigger operation. The interactive control is displayed on the current interface, and the display of the control panel is restored when the click operation on the interactive control is detected, such that the control panel controls the lyric display panel to display the lyric. In the whole process, the control of the control panel and the lyric display panel is achieved without an application interface of an operating system, and thus the convenience in operation is improved.

It should be understood that the above general description and the following detailed description are only exemplary and illustrative, and not intended to limit the present application.

DETAILED DESCRIPTION

The exemplary embodiments will be described in detail herein, and examples thereof are shown in the accompanying drawings. When the following description refers to the drawings, unless otherwise indicated, the same numbers in different drawings indicate the same or similar elements. The implementations described the following exemplary embodiments are not all the embodiments consistent with the present application. On the contrary, these embodiments are simply examples of apparatuses and methods consistent with some aspects of the present application, as detailed in the appended claims.

Figure 1:
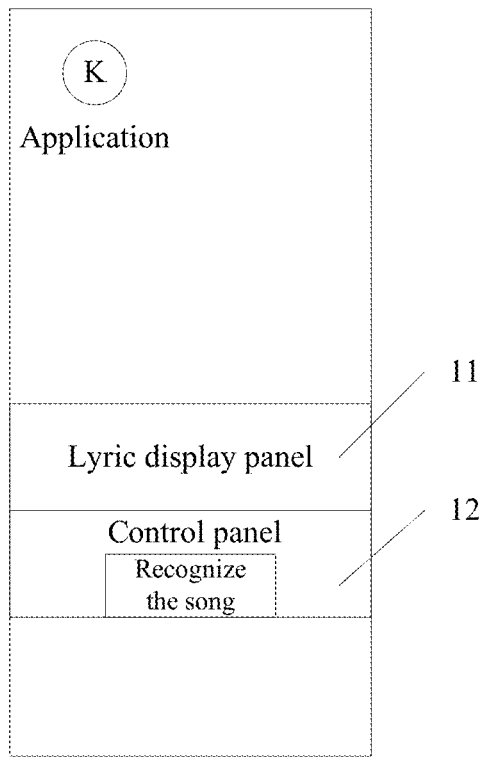
FIG. 1 is a schematic diagram showing an application scenario of a method for displaying a lyric according to an exemplary embodiment.

With the development of Internet technologies, various music players have emerged. The music player may start a function of displaying a lyric on a desktop. In this function mode, a lyric display panel and a control panel are displayed on a current interface in a form of a floating window. The current interface may be a desktop of a terminal's operating system or a terminal's application interface. As shown in FIG. 1, the technical solutions of the present application are described in the embodiments of the present application by taking the current interface being the desktop of the terminal's operating system as an example. The lyric display panel 11 is used to display a lyric of a song; and the control panel 12 contains an interactive control used to control the lyric display panel.

However, in the related art, the lyric display panel and the control panel displayed on the desktop in the form of the floating window may cover application icons on the desktop. If a desktop application icon covered by the floating window needs to be operated, it is necessary to set the floating window to be in a non-triggerable state through an application interface of an operating system, such that the lyric display panel and the control panel in the floating window are not capable of receiving trigger operations, but the desktop application icon covered by the floating window is capable of receiving the trigger operation. If the lyric display panel and the control panel in the floating window need to be triggered, it is necessary to change the state of the floating window to be in a triggerable state through the application interface again, such that the desktop application icons covered by the floating window is not capable of receiving a trigger operation. The entire operation process is cumbersome and poor in operability.

Figure 2:
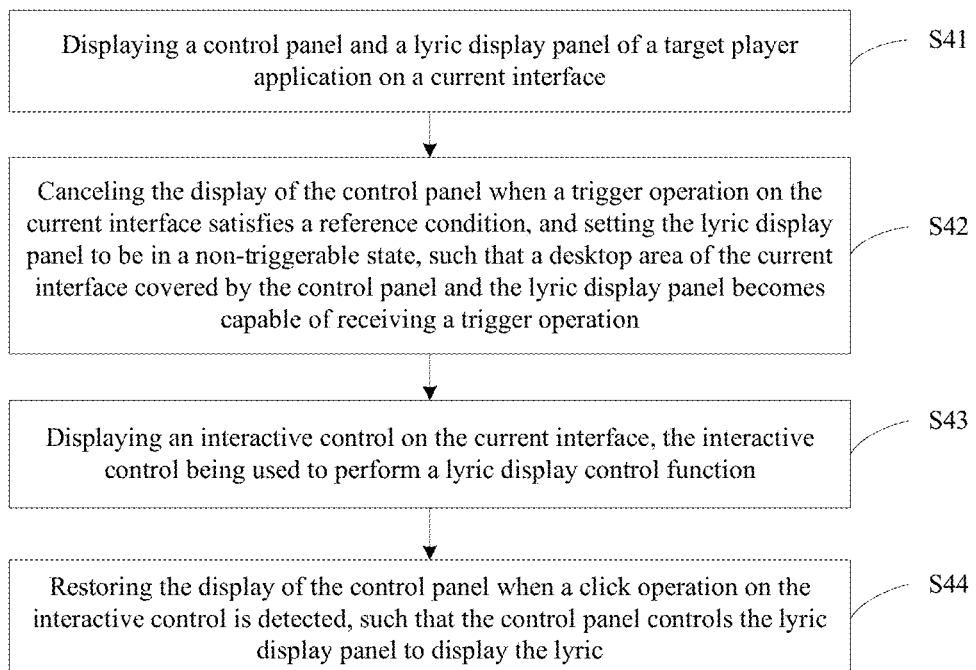
FIG. 2 is a flowchart of a method for displaying a lyric according to an exemplary embodiment.

Referring to FIG. 2, an embodiment of the present application provides a method for displaying a lyric. This method may be applied to a terminal. The terminal may be a mobile phone, a tablet computer, a notebook computer, a desktop computer, a portable computer, etc., which is not limited in this embodiment of the present application. This embodiment of the present application takes the execution subject being a terminal as an example. The method includes the following steps.

In S41, a control panel and a lyric display panel of a target player application are displayed on a current interface.

The current interface refers to an interface used to display a lyric currently. The current interface may be a desktop of an operating system of a terminal or an application interface of the terminal, which is not limited in this embodiment of the present application. The target player application refers to an application used to plays a song currently. The lyric display panel is used to display the lyric of the song; and the control panel contains interactive controls used to control the lyric display panel.

In an exemplary embodiment, a description will be made by taking the terminal being a mobile phone and the current interface being a desktop of an operating system of the mobile phone as an example. The desktop of the operating system of the mobile phone is shown in FIG. 1. The control panel 12 and the lyric display panel 11 of the target player application are displayed on the desktop of this operating system. This target player application is not limited in this embodiment of the present application, as long as this target player application is capable of forming the control panel 12 and the lyric display panel 11 as shown in FIG. 1 and displaying them on the desktop of the operating system. The presentation of the control panel 12 and the lyric display panel 11 on the desktop is not limited in this embodiment of the present application, as long as the control panel 12 and the lyric display panel 11 are displayed on the desktop of the operating system in the form of a floating window or other display forms.

In S42, the display of the control panel is canceled when a trigger operation on the current interface satisfies a reference condition, and the lyric display panel is set to be in a non-triggerable state, such that a desktop area of the current interface covered by the control panel and the lyric display panel becomes capable of receiving a trigger operation.

As an optional embodiment of the present application, the reference condition that is satisfied by the trigger operation on the current interface may include: detecting no trigger operation on any one of the control panel and the lyric display panel within a reference duration.

In an exemplary embodiment, the reference duration may be determined according to the needs of use, and may be set for a few seconds, for example, 3 seconds. A plurality of time ranges may also be set in advance, and a user may choose a required time range as the reference duration according to his/her own operating habits for the target player application. The reference duration is not limited in this embodiment of the present application.

The reference condition that is satisfied by the trigger operation on the current interface may further include: detecting a trigger operation in a desktop area outside the control panel and the lyric display panel.

The desktop area outside the control panel and the lyric display panel refers to any area in the current interface except an area covered by the control panel and the lyric display panel. In an exemplary embodiment, as shown in FIG. 1, in addition to the control panel 12 and the lyric display panel 11, the desktop of the operating system also includes an application icon. The display of the control panel is canceled when a terminal detects a trigger operation on the application icon, and the lyric display panel is set to be in a non-triggerable state, such that a desktop area of the operating system covered by the control panel and the lyric display panel becomes capable of receiving a trigger operation.

When the trigger operation on the current interface satisfies any one of the above two reference conditions, it is indicated that the current user does not need to operate the control panel and the lyric display panel. At this time, the display of the control panel is canceled, and the lyric display panel is set to in a non-triggerable state, such that the desktop of the operating system of the terminal may receive the trigger operation from the user.

As an optional embodiment of the present application, the step S42 includes: setting a background color of the lyric display panel as a target color when the lyric display panel is in the non-triggerable state.

In an exemplary embodiment, when the lyric display panel is set to in the non-triggerable state, the background color of the lyric display panel may be set as the target color, such that the user can clearly and accurately perform a trigger operation on the desktop area covered by the control panel and the lyric display panel on the desktop of the operating system. The target color may be transparent, semi-transparent, or other colors that are visually convenient to observe the desktop area covered by the control panel and the lyric display panel, which is not limited in this embodiment of the present application.

In S43, an interactive control is displayed on the current interface, the interactive control being used to perform a lyric display control function.

After canceling the display of the control panel and setting the lyric display panel to be in the non-triggerable state, the terminal displays the interactive control on the current interface, which facilitates the control of a lyric display function.

Figure 3:
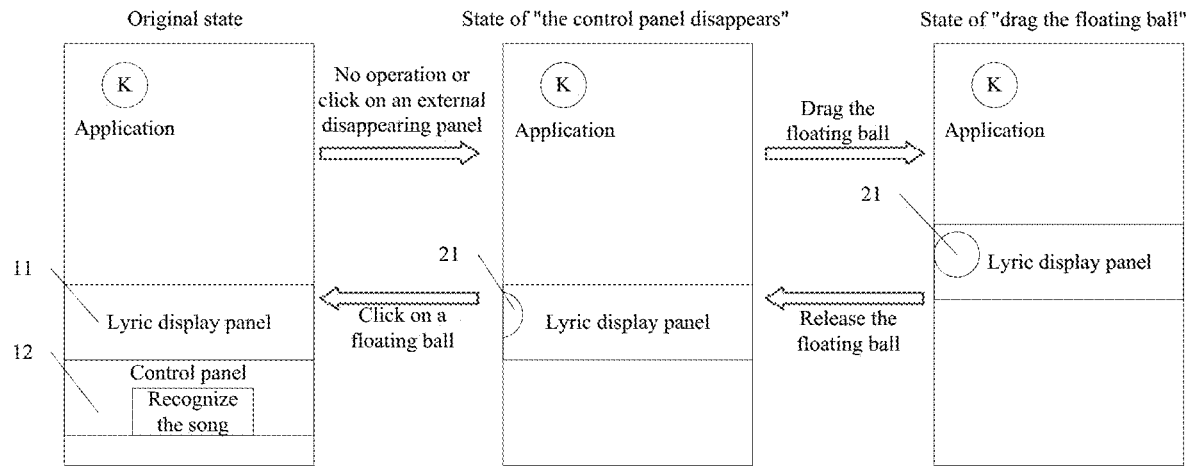
FIG. 3 is a schematic diagram showing an application scenario of a method for displaying a lyric according to an exemplary embodiment.

In an exemplary embodiment, the interactive control may be a floating ball (as shown in FIG. 3) or other interactive controls for performing the lyric display control function. The form of the interactive control is not limited in this embodiment of the present application, and may be determined by a person skilled in the art according to actual use needs.

As an optional embodiment of the present application, displaying the interactive control on the current interface includes: displaying the interactive control in a target display area of the lyric display panel. The target display area may be any area in the lyric display panel, which is not limited in this embodiment of the present application.

In an exemplary embodiment, as shown in FIG. 3, in a state of "the control panel disappears", a floating ball 21 may be provided on the edge of the desktop of the lyric display panel. Further, part of the floating ball may be hidden at the edge of the desktop to avoid sheltering the desktop, as long as the user is allowed to visually determine the position of the floating ball.

When the user operates the floating ball, e.g., in a state of "drag the floating ball", the entire floating ball is displayed.

In S44, the display of the control panel is restored when a click operation on the interactive control is detected, such that the control panel controls the lyric display panel to display the lyric.

When the click operation on the interactive control is detected, it is indicated that the current user needs to control the lyric display panel by operating the control panel. In this case, the terminal restores the display of the control panel.

In an exemplary embodiment, as shown in FIG. 3, when the terminal detects the click operation on the floating ball, the desktop of the operating system of the terminal changes from the state of "the control panel disappears" into an "original state", and the display of the control panel 12 is restored in the "original state", such that the control panel 12 controls the lyric display panel 11 to display the lyric.

According to the method for displaying the lyric provided by this embodiment of the present application, the control panel and the lyric display panel of the target player application are displayed on the current interface. The display of the control panel is canceled when the trigger operation on the current interface satisfies the reference condition, and the lyric display panel is set to be in the non-triggerable state, such that an application icon of the current interface covered by the control panel and the lyric display panel is capable of receiving the trigger operation. The interactive control is displayed on the current interface, and the display of the control panel is restored when the click operation on the interactive control is detected, such that the control panel controls the lyric display panel to display the lyric In the whole process, the control of the control panel and the lyric display panel is achieved without an application interface of an operating system, and thus the convenience in operation is improved.

As an optional embodiment of the present application, after S43, the method further includes:

when a dragging operation on the interactive control is detected, changing a display position of the lyric display panel based on an operation trajectory of the dragging operation.

In an exemplary embodiment, the user drags the interactive control in the state of "the control panel disappears", such that the lyric display panel moves based on the operation trajectory of the dragging operation. The operation trajectory may be a vertical movement along the desktop of the operating system of the terminal, such that the lyric display panel may be displayed in different positions on the desktop of the operating system.

As an optional embodiment of the present application, after S44, the method further includes:

when a dragging operation on the interactive control is detected, changing a display position of the lyric display panel based on an operation trajectory of the dragging operation.

In an exemplary embodiment, the user drags the interactive control in the state of "the control panel disappears", such that the lyric display panel moves based on the operation trajectory of the dragging operation. The operation trajectory may be a vertical movement along the desktop of the operating system of the terminal, such that the lyric may be displayed in different positions on the desktop of the operating system.

As an optional embodiment of the present application, when the dragging operation on the interactive control is detected, changing the display position of the lyric display panel based on the operation trajectory of the dragging operation includes.

setting a background color of the lyric display panel as a first background color when the dragging operation on the interactive control is detected;

during the execution of the dragging operation, moving the lyric display panel of the first background color based on the operation trajectory of the dragging operation; and setting the background color of the lyric display panel as a second background color when it is detected that the dragging operation ends, and displaying the lyric display panel of the second background color at a released position of the interactive control.

In an exemplary embodiment, as shown in FIG. 3, the terminal sets a background color of the lyric display panel as a first background color when the desktop of the operating system is in the state of "drag the floating ball", in the case that the dragging operation on the interactive control is detected, that is, when it is detected that the user drags the floating ball. During the execution of the dragging operation, the lyric display panel of the first background color is moved based on the operation trajectory of the dragging operation; and sets the background color of the lyric display panel as a second background color, and displays the lyric display panel of the second background color at a released position of the interactive control when it is detected that the dragging operation ends, that is, when it is detected that the user releases the floating ball. By setting different background colors for the lyric display panel during the dragging operation process and at the end of the dragging operation, it is convenient for the user to visually determine the dragging process and the final display position of the lyric display panel. When the dragging ends, that is, when the floating ball is released, the second background color of the lyric display panel may be set to be transparent, so as to visually display the desktop area covered by the lyric display panel more clearly.

Figure 4:
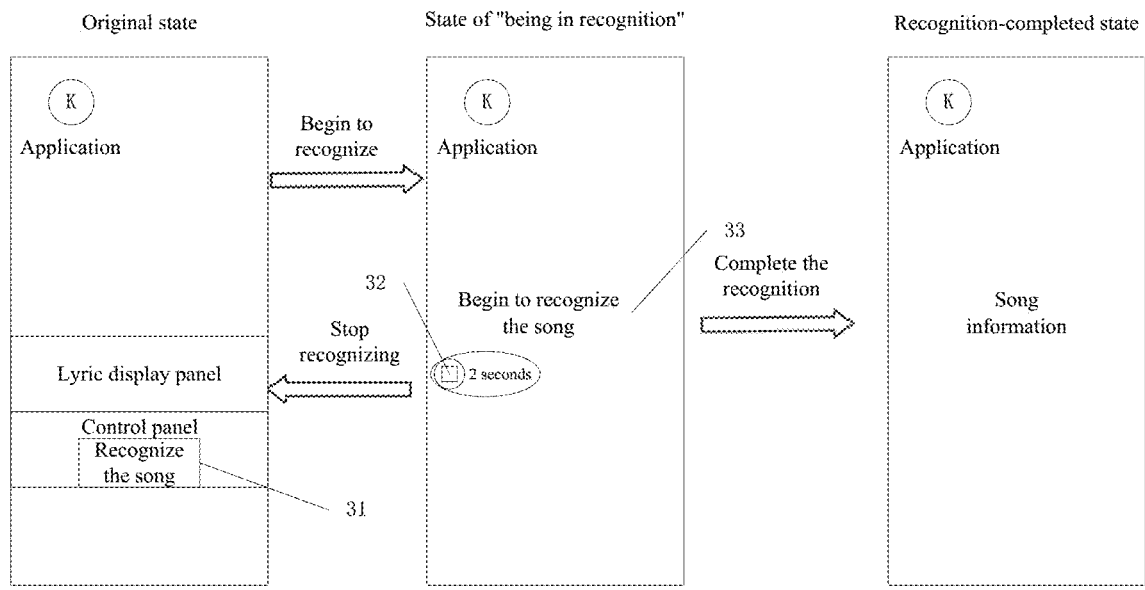
FIG. 4 is a schematic diagram showing an application scenario of a method for displaying a lyric according to an exemplary embodiment.

As an optional embodiment of the present application, as shown in FIG. 4, a song recognition function interactive control 31 is displayed in the control panel, the song recognition function interactive control 31 being used to trigger an audio signal collection and recognition process.

As an optional embodiment of the present application, the method further includes the following step.

In S45, the display of the control panel and the lyric display panel is cancelled when a trigger operation on the song recognition function interactive control is detected; and a recognition interactive control is displayed on the current interface, the recognition interactive control being used to control a song recognition process.

As an optional embodiment of the present application, when the recognition interactive control is displayed on the current interface, song recognition prompt information may also be displayed on the current interface.

In an exemplary embodiment, taking the current interface being the desktop of the operating system of the terminal as an example, as shown in FIG. 4, when the trigger operation on the song recognition function interactive control is detected in the "original state", the terminal begins to recognize, and the desktop of the operating system of the terminal enters a state of "being in recognition". In this case, the display of the control panel and the lyric display panel is canceled. The song recognition prompt information 33 and the recognition interactive control 32 are displayed on the desktop of the operating system. The song recognition prompt information may be any information used to inform the user of beginning to recognize a song, for example, text information of "begin to recognize the song" is displayed. The recognition interactive control may be used to control the recognition process of recognizing the song, and the end of the recognition process may be controlled by operating the recognition interactive control. When the end of the recognition process is controlled by operating the "recognition interactive control", the terminal stops recognizing, and the desktop of the operating system of the terminal changes from the state of "being in recognition" to the "original state". The desktop of the operating system in the state of "being in recognition" may also be provided with a recognition time prompt interface, such that the user can understand the recognition time in time. The recognition time prompt interface is used to prompt the current recognition time. For example, the desktop of the operating system in the state of "being in recognition" in FIG. 4 shows that the current recognition time is 2 seconds.

As an optional embodiment of the present application, after S45, the method further includes:

displaying the recognized song information on the current interface when the recognition is successful.

In an exemplary embodiment, as shown in FIG. 4, when the recognition is completed and the recognition is successful, the desktop of the operating system changes from the state of "being in recognition" to a "recognition-completed state". The recognized song information is displayed on the desktop of the operating system in the "recognition-completed state". A recognition process and a recognition result may be prompted in a form of broadcast while the recognized song information is displayed on the desktop of the operating system.

As an optional embodiment of the present application, after S45, the method further includes:

displaying recognition failure information when the recognition fails, and restoring the display of the control panel and the lyric display panel.

In an exemplary embodiment, the recognition failure information may be text information of "no recognition result temporarily" to inform the user that no corresponding song information is recognized, and to restore the display of the control panel and the lyric display panel. The way of restoring the display of the control panel and the lyric display panel may be to restore the display of the control panel and the lyric display panel after a certain period of time after the recognition failure information is displayed; or may be to restore the display of the control panel and the lyric display panel by operating other interactive modules after the display of the recognition failure information is canceled. The way of restoring the display of the control panel and the lyric display panel is not limited in this embodiment of the present application.

It should be noted that the above song recognition process lies in that the terminal transmits the collected audio information to a server, receives a recognition result transmitted by the server, and displays the recognition result on a display interface of the terminal.

Figure 5:
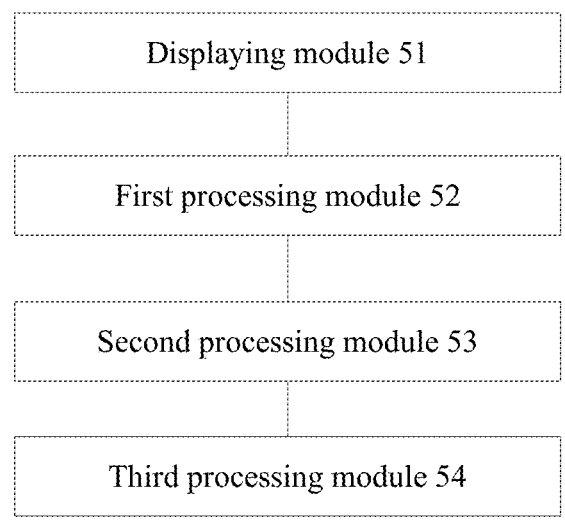
FIG. 5 is a block diagram of an apparatus for displaying a lyric according to an exemplary embodiment.

FIG. 5 is a block diagram of an apparatus for displaying a lyric according to an exemplary embodiment. Referring to FIG. 5, the apparatus includes a displaying module 51, a first processing module 52, a second processing module 53, and a third processing module 54.

The displaying module 51 is used to display a control panel and a lyric display panel of a target player application on a current interface.

The first processing module 52 is used to cancel the display of the control panel when a trigger operation on the current interface satisfies a reference condition, and set the lyric display panel to be in a non-triggerable state, such that a desktop area of the current interface covered by the control panel and the lyric display panel becomes capable of receiving a trigger operation.

The second processing module 53 is used to display an interactive control on the current interface, the interactive control being used to perform a lyric display control function.

The third processing module 54 is used to restore the display of the control panel when a click operation on the interactive control is detected, such that the control panel controls the lyric display panel to display the lyric.

According to the apparatus for displaying the lyric provided by this embodiment of the present application, the control panel and the lyric display panel of the target player application are displayed on the current interface. The display of the control panel is canceled when the trigger operation on the current interface satisfies the reference condition, and the lyric display panel is set to be in the non-triggerable state, such that an application icon of the current interface covered by the control panel and the lyric display panel is capable of receiving the trigger operation. An interactive control is displayed on the current interface, and the display of the control panel is restored when the click operation on the interactive control is detected, such that the control panel controls the lyric display panel to display the lyric In the whole process, the control of the control panel and the lyric display panel is achieved without an application interface of an operating system, and thus the convenience in operation is improved.

As an optional embodiment of the present application, the reference condition that is satisfied by the trigger operation on the current interface includes: detecting no trigger operation on any one of the control panel and the lyric display panel within a reference duration; or detecting a trigger operation in a desktop area outside the control panel and the lyric display panel.

As an optional embodiment of the present application, the second processing module is used to display the interactive control in a target display area of the lyric display panel.

As an optional embodiment of the present application, the second processing module or the third processing module is further configured to, when a dragging operation on the interactive control is detected, change a display position of the lyric display panel based on an operation trajectory of the dragging operation.

As an optional embodiment of the present application, the third processing module is further used to, when the dragging operation on the interactive control is detected, set a background color of the lyric display panel as a first background color; during the execution of the dragging operation, move the lyric display panel of the first background color based on the operation trajectory of the dragging operation; and set the background color of the lyric display panel as a second background color when it is detected that the dragging operation ends, and display the lyric display panel of the second background color at a released position of the interactive control.

As an optional embodiment of the present application, the first processing module is used to set the background color of the lyric display panel as a target color when the lyric display panel is in the non-triggerable state.

As an optional embodiment of the present application, a song recognition function interactive control is displayed in the control panel, the song recognition function interactive control being used to trigger an audio signal collection and recognition process.

As an optional embodiment of the present application, the apparatus further includes: a fourth processing module used to cancel the display of the control panel and the lyric display panel when a trigger operation on the song recognition function interactive control is detected; and display a recognition interactive control, the recognition interactive control being used to control a song recognition process.

As an optional embodiment of the present application, the fourth processing module is further used to display recognized song information on the current interface when the recognition is successful.

As an optional embodiment of the present application, the fourth processing module is further used to display recognition failure information when the recognition fails, and restore the display of the control panel and the lyric display panel.

With respect to the apparatus in the foregoing embodiment, the specific manner in which each module performs the operation has been described in detail in the embodiment of the method, and a detailed description will not be given here.

Figure 6:
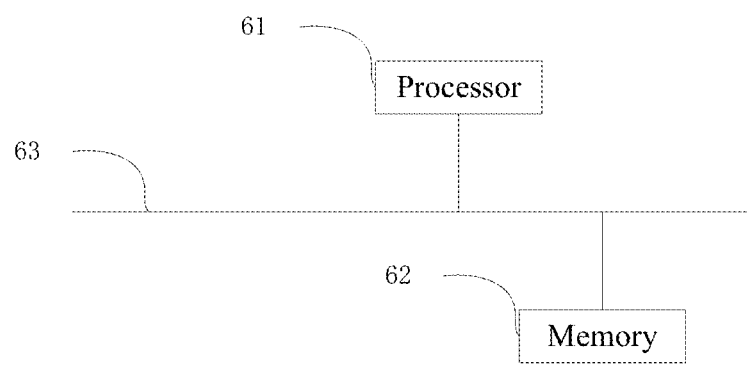
FIG. 6 is a block diagram of an electronic device according to an exemplary embodiment.

Based on the same technical concept, an embodiment of the present application further provides an electronic device. As shown in FIG. 6, the electronic device includes:

a processor 61;

a memory 62 used to store instructions executable by the processor 61, wherein the processor 61 is used to perform the method for displaying the lyric according to the above embodiments. The processor 61 and the memory 62 are connected through a communication bus 63.

It should be noted that the processor may be a central processing unit (CPU), a universal processor, a digital signal processor (DSP), an application specific integrated circuit (ASIC), a field-programmable gate array (FPGA), or other programmable logic device, discrete gate or transistor logic device, discrete hardware component, or the like. The universal processor may be a microprocessor, or any conventional processor. It is worth noting that the processor may be a processor that supports an advanced RISC machines (ARM) architecture.

Further, in an optional embodiment, the memory may include a read-only memory and a random access memory, and provide instructions and data to the processor. The memory may also include a non-volatile random access memory. For example, the memory may also store device type information.

The memory may be a volatile memory or a nonvolatile memory, or may include the both. The nonvolatile memory may include a read-only memory (ROM), a programmable ROM (PROM), an erasable PROM (EPROM), an electrically EPROM (EEPROM), or a flash memory. The volatile memory may be a random access memory (RAM) which may serve as an external cache. As an example, but without limitation, the RAM may be of various forms, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM).

Figure 7:
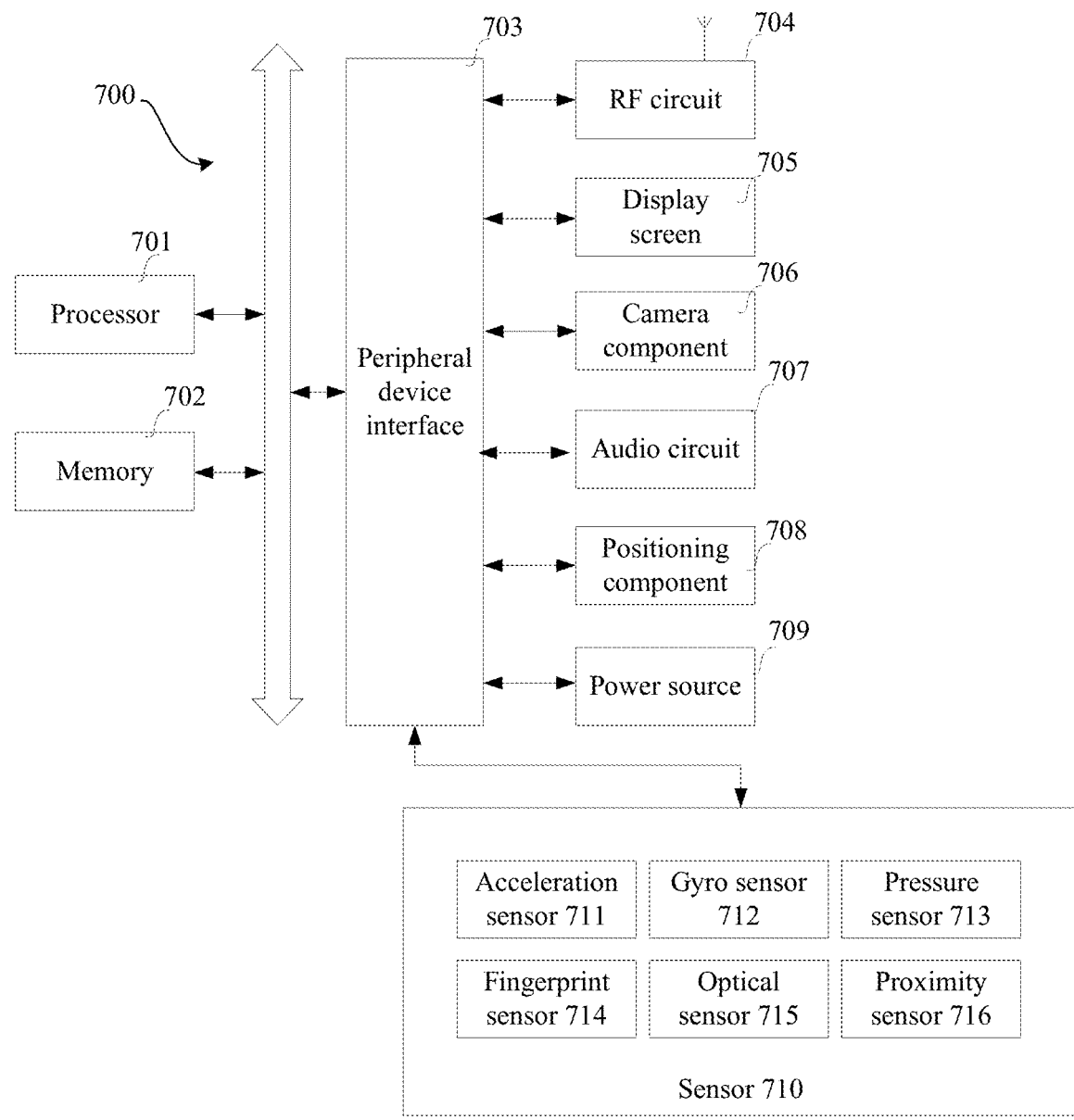
FIG. 7 is a block diagram of a terminal according to an exemplary embodiment.

FIG. 7 is a block diagram of a terminal 700 according to an exemplary embodiment. The terminal 700 may be a smart phone, a tablet computer, a notebook computer, or a desktop computer. The terminal 700 may also be called a UE (User Equipment), a portable terminal, a laptop terminal, a desk terminal, etc.

Generally, the terminal 700 includes a processor 701 and a memory 702.

The processor 701 may include one or more processing cores, such as a 4-core processor and an 8-core processor. The processor 701 may be implemented by at least one hardware of a digital signal processing (DSP), a field-programmable gate array (FPGA), and a programmable logic array (PLA). The processor 701 may also include a main processor and a coprocessor. The main processor is a processor used to process the data in an awake state, and is also called a central processing unit (CPU). The coprocessor is a low-power-consumption processor used to process the data in a standby state. In some embodiments, the processor 701 may be integrated with a graphics processing unit (GPU), which is used to render and draw the content that needs to be displayed by a display screen. In some embodiments, the processor 701 may also include an artificial intelligence (AI) processor used to process computational operations related to machine learning.

The memory 702 may include one or more computer-readable storage mediums, which can be non-transitory. The memory 702 may also include a high-speed random access memory, as well as a non-volatile memory, such as one or more disk storage devices and flash storage devices. In some embodiments, a non-transitory computer-readable storage medium in the memory 702 is used to store at least one instruction, which is executed by the processor 701 to implement the method for displaying the lyric according to the method embodiment of the present application.

In some embodiments, the terminal 700 also optionally includes a peripheral device interface 703 and at least one peripheral device. The processor 701, the memory 702, and the peripheral device interface 703 may be connected by a bus or a signal line. Each peripheral device may be connected to the peripheral device interface 703 by a bus, a signal line or a circuit board. Specifically, the peripheral device includes at least one of a radio frequency circuit 704, a display screen 705, a camera 706, an audio circuit 707, a positioning component 708 and a power source 709.

The peripheral device interface 703 may be used to connect at least one peripheral device associated with an input/output (I/O) to the processor 701 and the memory 702. In some embodiments, the processor 701, the memory 702 and the peripheral device interface 703 are integrated on the same chip or circuit board. In some other embodiments, any one or two of the processor 701, the memory 702 and the peripheral device interface 703 may be implemented on a separate chip or circuit board, which is not limited in the present embodiment.

The radio frequency circuit 704 is used to receive and transmit a radio frequency (RF) signal, which is also referred to as an electromagnetic signal. The radio frequency circuit 704 communicates with a communication network and other communication devices via the electromagnetic signal. The radio frequency circuit 704 converts the electrical signal into the electromagnetic signal for transmission, or converts the received electromagnetic signal into the electrical signal. Optionally, the RF circuit 704 includes an antenna system, an RF transceiver, one or more amplifiers, a tuner, an oscillator, a digital signal processor, a codec chipset, a subscriber identity module card, and the like. The RF circuit 704 can communicate with other terminals via at least one wireless communication protocol. The wireless communication protocol includes, but is not limited to, a metropolitan area network, various generations of mobile communication networks (2G, 3G, 4G, and 5G), a wireless local area network, and a wireless fidelity (WiFi) network. In some embodiments, the RF circuit 704 may also include near field communication (NFC) related circuits, which is not limited in the present application.

The display screen 705 is used to display a user interface (UI). The UI may include graphics, text, icons, videos, and any combination thereof. When the display screen 705 is a touch display screen, the display screen 705 also has the capacity to acquire touch signals on or over the surface of the display screen 705. The touch signal may be input into the processor 701 as a control signal for processing. At this time, the display screen 705 may also be used to provide virtual buttons and/or virtual keyboards, which are also referred to as soft buttons and/or soft keyboards. In some embodiments, one display screen 705 may be disposed on the front panel of the terminal 700. In some other embodiments, at least two display screens 705 may be disposed respectively on different surfaces of the terminal 700 or in a folded design. In further embodiments, the display screen 705 may be a flexible display screen disposed on the curved or folded surface of the terminal 700. Even the display screen 705 may have an irregular shape other than a rectangle. That is, the display screen 805 may be an irregular-shaped screen. The display screen 705 may be prepared from a material such as a liquid crystal display (LCD), an organic light-emitting diode (OLED), etc.

The camera component 706 is used to capture images or videos. Optionally, the camera component 706 includes a front camera and a rear camera. Usually, the front camera is placed on the front panel of the terminal, and the rear camera is placed on the back of the terminal. In some embodiments, at least two rear cameras are disposed, and are at least one of a main camera, a depth-of-field camera, a wide-angle camera, and a telephoto camera respectively, so as to realize a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 706 may also include a flashlight. The flashlight may be a mono-color temperature flashlight or a two-color temperature flashlight. The two-color temperature flash is a combination of a warm flashlight and a cold flashlight and can be used for light compensation at different color temperatures.

The audio circuit 707 may include a microphone and a speaker. The microphone is used to collect sound waves of users and environments, and convert the sound waves into electrical signals which are input into the processor 701 for processing, or input into the RF circuit 704 for voice communication. For the purpose of stereo acquisition or noise reduction, there may be a plurality of microphones respectively disposed at different locations of the terminal 700. The microphone may also be an array microphone or an omnidirectional acquisition microphone. The speaker is then used to convert the electrical signals from the processor 701 or the RF circuit 704 into the sound waves. The speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 707 may also include a headphone jack.

The positioning component 708 is used to locate the current geographic location of the terminal 700 to implement navigation or location based service (LBS). The positioning component 708 may be a positioning component based on the American global positioning system (GPS), the Chinese Beidou system, the Grenas system in Russia or the Russian Galileo system.

The power source 709 is used to power up various components in the terminal 700. The power source 709 may be alternating current, direct current, a disposable battery, or a rechargeable battery. When the power source 709 includes the rechargeable battery, the rechargeable battery may a wired rechargeable battery or a wireless rechargeable battery. The rechargeable battery may also support the fast charging technology.

In some embodiments, the terminal 700 also includes one or more sensors 710. The one or more sensors 710 include, but are not limited to, an acceleration sensor 711, a gyro sensor 712, a pressure sensor 713, a fingerprint sensor 714, an optical sensor 715 and a proximity sensor 716.

The acceleration sensor 711 may detect magnitudes of accelerations on three coordinate axes of a coordinate system established by the terminal 700. For example, the acceleration sensor 711 may be used to detect components of a gravitational acceleration on the three coordinate axes. The processor 701 may control the touch display screen 705 to display a user interface in a landscape view or a portrait view according to a gravity acceleration signal collected by the acceleration sensor 711. The acceleration sensor 711 may also be used to collect motion data of a game or a user.

The gyro sensor 712 can detect a body direction and a rotation angle of the terminal 700, and can cooperate with the acceleration sensor 711 to collect a 3D motion of the user on the terminal 700. Based on the data collected by the gyro sensor 712, the processor 701 can serve the following functions: motion sensing (such as changing the UI according to a user's tilt operation), image stabilization during shooting, game control and inertial navigation.

The pressure sensor 713 may be disposed on a side frame of the terminal 700 and/or a lower layer of the touch display screen 705. When the pressure sensor 713 is disposed on the side frame of the terminal 700, a user's holding signal to the terminal 700 can be detected. The processor 701 can perform left-right hand recognition or quick operation according to the holding signal collected by the pressure sensor 713. When the pressure sensor 713 is disposed on the lower layer of the touch display screen 705, the processor 701 controls an operable control on the UI according to a user's pressure operation on the touch display screen 705. The operable control includes at least one of a button control, a scroll bar control, an icon control and a menu control.

The fingerprint sensor 714 is used to collect a user's fingerprint. The processor 701 identifies the user's identity based on the fingerprint collected by the fingerprint sensor 714, or the fingerprint sensor 714 identifies the user's identity based on the collected fingerprint. When the user's identity is identified as trusted, the processor 701 authorizes the user to perform related sensitive operations, such as unlocking the screen, viewing encrypted information, downloading software, paying, and changing settings. The fingerprint sensor 714 may be provided on the front, back, or side of the terminal 700. When the terminal 700 is provided with a physical button or a manufacturer's Logo, the fingerprint sensor 714 may be integrated with the physical button or the manufacturer's Logo.

The optical sensor 715 is used to collect ambient light intensity. In one embodiment, the processor 701 may control the display brightness of the touch display screen 705 according to the ambient light intensity collected by the optical sensor 715. Specifically, when the ambient light intensity is high, the display brightness of the touch display screen 705 is increased, and when the ambient light intensity is low, the display brightness of the touch display screen 705 is decreased. In another embodiment, the processor 701 may also dynamically adjust shooting parameters of the camera component 706 according to the ambient light intensity collected by the optical sensor 715.

The proximity sensor 716, also referred to as a distance sensor, is usually disposed on the front panel of the terminal 700. The proximity sensor 716 is used to capture a distance between the user and a front surface of the terminal 700. In one embodiment, when the proximity sensor 716 detects that the distance between the user and the front surface of the terminal 700 becomes gradually smaller, the processor 701 controls the touch display screen 705 to switch from a screen-on state to a screen-off state. When it is detected that the distance between the user and the front surface of the terminal 700 gradually increases, the processor 701 controls the touch display screen 705 to switch from the screen-off state to the screen-on state.

It will be understood by those skilled in the art that the structure shown in FIG. 7 does not constitute a limitation to the terminal 700, and may include more or less components than those illustrated, or combine some components or adopt different component arrangements.

The present application provides a computer-readable storage medium. Instructions in the computer-readable storage medium, when being executed by a processor of a terminal, enable the terminal to perform the method for displaying the lyric according to the above embodiments. The computer-readable storage medium may be non-transitory. For example, the computer-readable storage medium may be a read-only memory, a magnetic disk, a compact disc, etc.

The present application provides a computer program, which, when being executed by a computer, enables a processor or the computer to perform various steps and/or processes corresponding to the above method embodiments.

Other embodiments of the present application will be apparent to those skilled in the art from consideration of the specification and practice the present application herein. The present application is intended to cover any variations, uses, or adaptations of the present application, following the general principles thereof and including common knowledge or commonly used technical measures which are not disclosed herein. The specification and embodiments are to be considered as exemplary only, and the true scope and spirit of the present application are indicated by the following claims.

It should be appreciated that the present application is not limited to the exact construction that has been described above and illustrated in the accompanying drawings, and that various modifications and changes can be made without departing from the scope thereof. It is intended that the scope of the present application is only limited by the appended claims.

What is claimed is:

1. A method for displaying a lyric, applied to a terminal and comprising:
    displaying a control panel and a lyric display panel of a target player application on an interface;
    canceling a display of the control panel when a trigger operation on the interface satisfies a reference condition, and setting the lyric display panel to be in a non-triggerable state, such that a desktop area of the interface covered by the control panel and the lyric display panel becomes capable of receiving a trigger operation;
    displaying an interactive control in a target display area of the lyric display panel when the lyric display panel is in the non-triggerable state on the interface, the interactive control being configured to perform a lyric display control function; and
    restoring the display of the control panel and setting the lyric display panel to be in a triggerable state when a click operation on the interactive control is detected, such that the control panel controls the lyric display panel to display the lyric.

2. The method according to claim 1, wherein the reference condition comprises at least one of the following:
    detecting no trigger operation on any one of the control panel and the lyric display panel within a reference duration; and
    detecting a trigger operation in a desktop area outside the control panel and the lyric display panel.

3. The method according to claim 1, wherein after displaying the interactive control on the interface, the interactive control being configured to perform the lyric display control function, and restoring the display of the control panel when the click operation on the interactive control is detected, the method further comprising:
    when a dragging operation on the interactive control is detected, changing a display position of the lyric display panel based on an operation trajectory of the dragging operation.

4. The method according to claim 3, wherein when the dragging operation on the interactive control is detected, changing the display position of the lyric display panel based on the operation trajectory of the dragging operation comprises:
    setting a background color of the lyric display panel as a first background color when the dragging operation on the interactive control is detected;
    during the execution of the dragging operation, moving the lyric display panel of the first background color based on the operation trajectory of the dragging operation; and
    setting the background color of the lyric display panel as a second background color when it is detected that the dragging operation ends, and displaying the lyric display panel of the second background color at a released position of the interactive control.

5. The method according to claim 1, wherein canceling the display of the control panel when the trigger operation on the interface satisfies the reference condition and setting the lyric display panel to be in a non-triggerable state comprises:
    setting the background color of the lyric display panel as a target color when the lyric display panel is in the non-triggerable state.

6. The method according to claim 1, wherein a song recognition function interactive control is displayed in the control panel, the song recognition function interactive control being configured to trigger an audio signal collection and recognition process.

7. The method according to claim 6, further comprising:
canceling the display of the control panel and the lyric display panel when a trigger operation on the song recognition function interactive control is detected; and
displaying a recognition interactive control on the interface, the recognition interactive control being configured to control a song recognition process.

8. The method according to claim 7, wherein after displaying the recognition interactive control on the interface, the method further comprising:
displaying recognized song information on the interface when the song recognition process is successful; and
displaying recognition failure information when the song recognition process fails, and restoring the display of the control panel and the lyric display panel.

9. A non-transitory computer-readable storage medium, having instructions stored therein, wherein a processor of a terminal performs the method for the display the lyric according to claim 1 when the instructions are executed by the processor of the terminal.

10. An apparatus for displaying a lyric, comprising:
a processor configured to:
display a control panel and a lyric display panel of a target player application on an interface;
cancel the display of the control panel when a trigger operation on the interface satisfies a reference condition, and set the lyric display panel to be in a non-triggerable state, such that a desktop area of the interface covered by the control panel and the lyric display panel becomes capable of receiving a trigger operation;
display an interactive control in a target display area of the lyric display panel when the lyric display panel is in the non-triggerable state on the interface, the interactive control being configured to perform a lyric display control function; and
restore the display of the control panel and setting the lyric display panel to be in a triggerable state when a click operation on the interactive control is detected, such that the control panel controls the lyric display panel to display the lyric.

11. An electrical electronic device, comprising:
a processor; and
a memory storing instructions executable by the processor, wherein the processor is configured to execute the instructions to perform a method for displaying a lyric, the method comprising:
displaying a control panel and a lyric display panel of a target player application on an interface;
canceling a display of the control panel when a trigger operation on the interface satisfies a reference condition, and setting the lyric display panel to be in a non-triggerable state, such that a desktop area of the interface covered by the control panel and the lyric display panel becomes capable of receiving a trigger operation;
displaying an interactive control in a target display area of the lyric display panel when the lyric display panel is in the non-triggerable state on the interface, the interactive control being configured to perform a lyric display control function; and
restoring the display of the control panel and setting the lyric display panel to be in a triggerable state when a click operation on the interactive control is detected, such that the control panel controls the lyric display panel to display the lyric.

12. The electronic device according to claim 11, wherein the reference condition comprises at least one of the following:
detecting no trigger operation on any one of the control panel and the lyric display panel within a reference duration; and
detecting a trigger operation in a desktop area outside the control panel and the lyric display panel.

13. The electronic device according to claim 11, wherein the method further comprises:
when a dragging operation on the interactive control is detected, changing a display position of the lyric display panel based on an operation trajectory of the dragging operation.

14. The electronic device according to claim 13, wherein the method further comprises:
setting a background color of the lyric display panel as a first background color when the dragging operation on the interactive control is detected;
during the execution of the dragging operation, moving the lyric display panel of the first background color based on the operation trajectory of the dragging operation; and
setting the background color of the lyric display panel as a second background color when it is detected that the dragging operation ends, and displaying the lyric display panel of the second background color at a released position of the interactive control.

15. The electronic device according to claim 11, wherein the method further comprises:
setting the background color of the lyric display panel as a target color when the lyric display panel is in the non-triggerable state.

16. The electronic device according to claim 12, wherein a song recognition function interactive control is displayed in the control panel, the song recognition function interactive control being configured to trigger an audio signal collection and recognition process.

17. The electronic device according to claim 16, wherein the method further comprises:
canceling the display of the control panel and the lyric display panel when a trigger operation on the song recognition function interactive control is detected; and
displaying a recognition interactive control on the interface, the recognition interactive control being configured to control a song recognition process.

18. The electronic device according to claim 17, wherein the method further comprises:
displaying recognized song information on the interface when the song recognition process is successful; and
displaying recognition failure information when the song recognition process fails, and restoring the display of the control panel and the lyric display panel.

* * * * *